United States Patent
Gray

[15] 3,660,234
[45] May 2, 1972

[54] METHOD OF ATTENUATING VIRUSES

[72] Inventor: Oscar S. Gray, Fort Lauderdale, Fla.

[73] Assignee: Gray Industries, Inc., Ft. Lauderdale, Fla.

[22] Filed: Feb. 16, 1971

[21] Appl. No.: 115,812

Related U.S. Application Data

[63] Continuation-in-part of Ser. No. 19,520, Mar. 17, 1970, abandoned, which is a continuation of Ser. No. 687,157, Dec. 1, 1967, abandoned.

[52] U.S. Cl....................................195/1.2, 424/89, 210/19
[51] Int. Cl............................................................C12r 7/00
[58] Field of Search..........................424/89; 195/1.2; 210/19

Primary Examiner—Richard L. Huff
Attorney—Wilson Oberdorfer

[57] ABSTRACT

A live virus is subjected to microwave energy under controlled conditions whereby the virus is attenuated to a less virulent state.

The present invention relates to a novel method for attenuating live viruses; and, more particularly, the present invention relates to a novel method for quickly attenuating viruses in a simple, controlled and reproducible manner.

13 Claims, No Drawings

METHOD OF ATTENUATING VIRUSES

RELATION TO OTHER APPLICATIONS

The present application is a continuation-in-part of copending application Ser. No. 19,520, now abandoned which was filed Mar. 17, 1970, as a continuation of application Ser. No. 687,157 filed Dec. 1, 1967 (now abandoned).

It is a principal object of the present invention to provide a novel method for attenuating viruses.

It is another object of the present invention to provide a novel method for attenuating viruses which is simple, economical, rapid and reproducible.

Still another object of the present invention is to provide a novel method for attenuating viruses which does not involve the use of added chemicals.

These and other objects will become apparent from a consideration of the following specification and claims.

SUMMARY OF THE INVENTION

The method of attenuating viruses of the present invention comprises subjecting the virus in a treating zone, while contained in a confined zone within said treating zone at least one wall of which confined zone is permeable to microwave energy, to microwave energy through a moving atmosphere of coolant gas under superatmospheric pressure, for at least 10 seconds but short of complete inactivation of the virus, said moving atmosphere being in direct contact with walls of said confined zone but out of direct contact with said virus and being at a temperature below about 60° F upon its admission to said treating zone. Preferably, the circulation of coolant gas is continued, after discontinuance of the passage of the microwave energy, for a period to cool the virus to a temperature below that reached by it during treatment with the microwave energy.

It has been found that the foregoing treatment is capable of attenuating viruses. Hence, the method of the present invention can be used to convert a live pathogenic virus into a less virulent, but living, state, and, therefore, provides a valuable tool in studying: viruses, virus infections, possible immunogenic forms of attenuated viruses, mechanisms for generating immunity, and the like. For example, in studying characteristics of pathogenic viruses, it would often be desirable to be able to work with the virus which is living but less virulent. This is especially true of the more hazardous viruses; in fact, research workers have hesitated to work at all with certain dangerous viruses, and proposals have also been made to employ mobile laboratories which can be moved to an isolated environment and which can be completely decontaminated in the event of an accident. Attenuation of viruses, therefore, could reduce or eliminate such problems. Attenuation also provides a means for studying the transmission of a normally lethal virus from generation to generation in laboratory animals and the presence or absence of virus and antibodies in succeeding generations, which would not be possible with the virulent form of the virus since this form is often fatal to the experimental animal.

Attenuation according to the present invention is accomplished rapidly—in a matter of seconds—as well as simply and economically. Moreover, conditions can be standardized for any particular virus to provide reproducible results from time to time. Thus, each lot or batch can be tested by techniques specific for each type of antigen. With known methods for attenuating viruses, on the other hand, by mutation, the mutant attenuated immunogenic agent is maintained as such by *in vitro* or *in vivo* continuous passage and there is no guarantee that, either through human error or genetic change, the attenuation may be lost.

As far as is presently known, any RNA or DNA virus should be susceptible to attenuation according to the present invention including: picorna, such as foot and mouth virus, polio viruses, coxsackie and ECHO; rabies; arboviruses, such as sleeping sickness viruses; myxo, such as influenza, measles and Newcastle disease; reo viruses; adenoviruses; hemorrhagic fevers; and the like. These viruses cause disease in animals (including man) and hence, they are pathogenic viruses.

The virus to be attenuated in accordance with the present invention may be in the form of a culture. The preparation of virus cultures is well known and is described in the literature such as in *Viruses of Vertebrates* by Sir Christopher Andrews, The Williams and Wilkins Co., Baltimore, Md., 1964, and "Cultivation of Viruses," A.M.A. *Archives of Pathology* by Murray Sanders et al., Vol. 56, pages 148–255, 1953. Two principal ways of preparing virus cultures are: (1) infecting the various membranes of the fertilized egg, such as the chorioallantoic membrane (CA) technique, and (2) infecting living cells, such as the tissue culture (TC) technique. In the former, the virus is grown in the allantoic fluid in the allantoic cavity of embryonated eggs. This technique is especially applicable to the preparation of cultures of most myxo viruses, such as influenza and Newcastle disease, and rabies. In the TC technique, the culture is grown on animal cells, such as on embryonic chick tissue or primate kidney tissue. This technique is especially applicable to foot and mouth disease virus and poliomyelitis virus.

Viruses, for treatment according to the present invention, may also be produced in organs of infected living animals. For example, Rift Valley fever virus and certain of the arboviruses grow better in such organs than in culture media. The infected organ may be removed from the animal, emulsified and centrifuged, and the supernatant liquid may be used as the virus-containing medium.

The virus material treated in accordance with the present invention may be in the form of a suspension in a liquid medium or it may be in solid form. For example, a virus culture produced by the TC technique can be treated as such, such as by treating the virus-containing tissue, preferably after rendering it to a finely-divided condition as by mincing. Likewise, the infected culture liquids from fertilized egg preparations may be employed directly. Infected cultures may be diluted prior to treatment, the diluent being any recognized media, such as distilled water, physiological saline, serum, Sorensen's phosphate buffered solution, and the like, depending upon the particular virus culture. If desired, the suspension can be clarified, as by centrifugation or filtration, to remove extraneous solid matter.

The concentration of virus in the medium being treated does not appear to be particularly critical. However, as a practical matter, it is not desired to treat large volumes of material in which only a small portion is the active agent and the more concentrated the virus in the medium the better the results. Hence, the concentration of virus in the medium being treated is generally not less than about 75,000 parts per million, and preferably not less than about 100,000 parts per million.

As is well known, microwave energy is the electromagnetic wave energy of the wave length falling in the microwave region of the electromagnetic spectrum. The Federal Communications Commission has presently set aside, for microwave processing, bands of microwave energy within the range of between about 400 and about 20,000 megacycles per second with a wave length ranging from about 13 inches for the lower frequencies to about 0.7 inches for the highest frequencies; specifically; frequencies of about 890 – 940 with a wave length of about 13 inches; frequencies of about 2,400 – 2,500 with a wave length of about 4 – 5 inches, and frequencies of 17,850 – 18,000 with a wave length of about 0.7 inch. However, the presently preferred microwave energy for use according to the present invention is in intermediate range having a frequency from about 1,000 to about 5,000, more particularly from about 2,000 to about 3,000, megacycles per second. Microwave energy is generated from a suitable high frequency source, such as a magnetron.

An essential feature of the present invention is holding the virus being treated in a confined zone during the treatment. The walls of the confined zone may be conventional, substantially gas-impermeable packaging materials like glass, polymethylmethacrylate, polystyrene and polyethylene, as in bottles, flasks, tubes and pouches. Part of the package or container may be of material impermeable to microwave energy, like aluminum and steel, so long as the wall of the container facing the source of microwave energy is permeable thereto. The confined zone will be essentially gas tight.

The confined zone holding the virus, whether it be a package or tubular pathway or the like, will be held in a larger chamber into which the microwave energy is directed to penetrate the microwave-permeable wall of the confined zone and permeate the virus.

Another essential feature of the invention is the circulation of a coolant gas, under superatmospheric pressure, through the treating chamber and around the walls of the confined zone holding the virus. The coolant gas employed may be any substantially inert (non-reactive with the environment in the presence of microwave energy) gas existing as a gas at the temperatures employed. especially air, nitrogen or carbon dioxide. While gases like argon, helium, neon, krypton, xenon, ethylene oxide, and mixtures thereof, and the like are equivalent, they are less desirable at the present because of their cost.

The temperature of the coolant gas entering the treating zone should be below about 60° F, and is preferably below about 55° F. While the temperature thereof may go as low as 0° F, there is no advantage in it going below about 20° F and at such lower temperatures there may be freezing problems if a virus suspension is left in the treating zone containing the cold gas for extended periods after the source of microwave energy has been turned off. A temperature for the incoming gas between about 30° and about 50° F has been found to be particularly suitable. The coolant gas will become warmed during its travel through the treating zone, particularly from contact with the walls of the confined zone holding the virus, and the warmed gas is removed from the treating zone making way for incoming coolant gas. When the gas is recirculated for reuse, the temperature thereof must be reduced back to the desired temperature for admission to the treating zone.

The pressure of the coolant gas in the treating zone will, as stated, be above atmospheric. Since the principal function of the coolant gas is to keep the walls of the confined zone at a temperature well below that of the virus being treated, forcing the coolant gas into the treating chamber and past the walls of the confined zone under pressure provides more efficient over-all cooling without some area or areas of the walls becoming insufficiently cooled. Pressures as low as 0.5 p.s.i.g. have been used and pressures as high as 50 p.s.i.g. may be desirable. In general, pressures from about 2 to about 40 p.s.i.g. have been found to be particularly suitable.

The precise time of treatment with microwave energy according to the present invention may depend somewhat upon the particular virus being treated. It has been found that the exposure time, in any case, should be at least about 10 seconds. It has also been found that overexposure results in complete inactivation of the virus. Since this is undesirable in the present instance, the total exposure time will be short of that producing such complete inactivation. Since this time will differ with differing viruses, it may be necessary to run a preliminary test or tests to note the extent to which the particular virus undergoing treatment can be subjected to the microwave energy without becoming completely inactivated. Each virus has its own bioassay so that it can readily be determined whether or not a treated sample thereof has become completely inactivated. A preferred goal of attenuation is the highest possible bioassay beyond the point of mammalian infectivity. The virus may be subjected, according to the present invention, to a single exposure or to a plurality of exposures to the microwave energy.

After exposure to the microwave energy for the required period of time, the source of microwave energy is turned off and the virus may be removed from the treating zone. It is preferred, however, to continue the cooling effect of the coolant gas after exposure to the microwave energy has been discontinued in order to cool or chill the attenuated virus, preferably at least down to room temperature. This can be accomplished by leaving the container of attenuated virus in the treating zone, through which is circulated the coolant gas, after the source of microwave energy has been turned off, or, in the case of continuous flow in a tube or tubes, by extending the flow beyond the field of direct microwave exposure in or beyond the treating zone while continuing the flow of coolant gas in contact with the tube walls.

Following treatment in accordance with the present invention, the attenuated virus is handled or treated in a manner which will be obvious to those skilled in this art. In many cases, the material can be used as such, as a research tool and for study. It may be desirable to add a preservative that will not injure the attenuated virus. If the material contains extraneous solid matter, as one that has not been clarified prior to treatment, it may be clarified as by centrifugation, filtration and the like.

The following example and data are given for the purpose of illustration and are not intended to limit the scope of the invention in any way:

This example illustrates the present process as applied to Type A influenza virus (American Type Culture COllection, Rockville, Maryland, VR. No. 95, strain: PR–8)

A culture of the virus is grown in the allantoic cavity of fertilized chicken eggs according to the allantoic fluid technique. The resulting suspension of the virus in allantoic fluids is harvested and divided into individual portions of 100 ml. each in sealed sterile glass bottles. One bottle is used as a control and the remainder are subjected to the following treatment for varying lengths of time as noted below. Treatment takes place in a pressure chamber equipped with a 1 KW magnetron connected to a 220 volt source of alternating current and delivering microwave energy into the chamber at about $2,450^{\pm 25}$ megacycles at a wave length of about 4.8 inches. Refrigerated nitrogen gas is flowed into, through and out of the chamber, its inlet temperature being about 48° F. and its exit temperature being about 80° F. Its pressure is 10 p.s.i.g. After each exposure, the bottles are left in the chamber, with the chilled nitrogen circulating, until they and their contents are cooled back to 70° F. All samples are then frozen until tested. The times of exposure for the materials are as follows:

| Portion | Time (seconds) |
|---------|----------------|
| Control | 0 |
| A | 20 |
| B | 30 |
| C | 35 |
| D | 40 |
| E | 45 |
| F | 50 |
| G | 55 |
| H | 60 |
| I | 90 |

A sample of each of the portions, control and treated, is inoculated into embryonated chicken eggs and a hemaglutination inhibition (HI) titer obtained. In the first passage, the HI titer is about 1:2,000 for all samples, including the control, and in the second passage the HI titer is also about 1:2,000. These results show the presence of living virus in all samples.

The portions are then tested for virulence, using groups of 20 Swiss mice each. A dose of 0.25 ml. is administered to each mouse by placing droplets, from a small syringe needle, in the nostrils for inhalation. After 10 days, 14 of the 20 mice receiving the control had died whereas none of the mice receiving treated material had died. No further deaths were noted during the next 20 days.

Modification is possible in the selection of the virus treated and in the particular techniques and procedural details without departing from the scope of the invention.

What is claimed is:

1. The method of attenuating a virus which comprises subjecting the virus in a treating zone, while contained in a confined zone within said treating zone at least one wall of which confined zone is permeable to microwave energy, to microwave energy through a moving atmosphere of coolant gas under superatmospheric pressure, for at least 10 seconds but short of complete inactivation of the virus, said moving atmosphere being in direct contact with walls of said confined zone but out of direct contact with said virus and being at a temperature below about 60° F. upon its admission to said treating zone.

2. The method of claim 1 wherein said confined zone is a sealed container holding said virus.

3. The method of claim 1 wherein said confined zone is a confined pathway through which said virus is flowed while being subjected to said microwave energy.

4. The method of claim 1 wherein after exposure to the microwave energy the treated virus in the confined zone is continued to be subjected to the action of said coolant gas.

5. The method of claim 1 wherein said virus is influenza virus.

6. The method of claim 5 wherein said virus is Type A influenza virus.

7. The method of claim 6 wherein said virus is Type A influenza virus, American Type Culture COllection, Rockville, Maryland, VR. No. 95, Strain: PR–8.

8. The method of claim 1 wherein said microwave energy has a frequency of from about 1,000 to about 5,000 megacycles per second.

9. The method of claim 8 wherein after exposure to the microwave energy the treated virus in the confined zone is continued to be subjected to the action of said coolant gas.

10. The method of claim 8 wherein said microwave energy has a frequency of from about 2,000 to about 3,000 megacycles per second.

11. The method of claim 10 wherein after exposure to the microwave energy the treated virus in the confined zone is continued to be subjected to the action of said coolant gas.

12. The method of claim 10 wherein said microwave energy has a frequency of from about 2,400 to about 2,500 megacycles per second.

13. The method of claim 12 wherein after exposure to the microwave energy the treated virus in the confined zone is continued to be subjected to the action of said coolant gas.

* * * * *